United States Patent
Lan et al.

(10) Patent No.: US 11,187,635 B2
(45) Date of Patent: Nov. 30, 2021

(54) DETECTING A FRACTION OF A COMPONENT IN A FLUID

(71) Applicant: Halliburton Energy Services, Inc., Houston, TX (US)

(72) Inventors: Xinwei Lan, Spring, TX (US); Li Gao, Katy, TX (US); Daniel Stark, Houston, TX (US); Yenny Natali Martinez, Houston, TX (US); Michel Joseph LeBlanc, Houston, TX (US); Gireesh K Bhat, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 30 days.

(21) Appl. No.: 16/333,140

(22) PCT Filed: Dec. 27, 2017

(86) PCT No.: PCT/US2017/068495
§ 371 (c)(1),
(2) Date: Mar. 13, 2019

(87) PCT Pub. No.: WO2019/132875
PCT Pub. Date: Jul. 4, 2019

(65) Prior Publication Data
US 2020/0240889 A1     Jul. 30, 2020

(51) Int. Cl.
*E21B 43/12* (2006.01)
*G01N 9/00* (2006.01)
(Continued)

(52) U.S. Cl.
CPC ............. *G01N 9/002* (2013.01); *E21B 28/00* (2013.01); *E21B 33/12* (2013.01); *E21B 34/06* (2013.01);
(Continued)

(58) Field of Classification Search
CPC .. G01N 9/002; G01N 24/081; E21B 49/0875; E21B 43/12; E21B 28/00; E21B 43/003; E21B 49/087
See application file for complete search history.

(56) References Cited

U.S. PATENT DOCUMENTS 5,095,983 A    3/1992   Magnani
5,361,632 A   11/1994   Magnani
(Continued)

FOREIGN PATENT DOCUMENTS

CN     102797453 A    11/2012
EP      1254352 B1     8/2006
(Continued)

OTHER PUBLICATIONS

Emerson Process Management, The Roxar Downhole product portfolio, Permanent downhole monitoring system, www.roxar.com, info.roxar@emerson.com.
(Continued)

*Primary Examiner* — Catherine Loikith
(74) *Attorney, Agent, or Firm* — Gilliam IP PLLC

(57) ABSTRACT

In one embodiment, the apparatus includes a production tubing for carrying fluids from a producing zone to a surface, and a three-way valve coupled to the production tubing, the three-way valve including an inlet from the production tubing, an outlet to the production tubing, and an inlet from the borehole surrounding the three-way valve. The apparatus further includes a resonant tube densitometer disposed in the outlet to the production tubing, the resonant tube densitometer configured to measure the density of the fluids. A flow meter is disposed in the outlet to the production tubing, the flow meter configured to measure volumetric flow of the fluids.

20 Claims, 12 Drawing Sheets

(51) Int. Cl.
E21B 49/08 (2006.01)
E21B 28/00 (2006.01)
E21B 33/12 (2006.01)
E21B 34/06 (2006.01)
E21B 47/10 (2012.01)

(52) U.S. Cl.
CPC .......... *E21B 47/10* (2013.01); *E21B 49/0875* (2020.05); *G01N 2009/006* (2013.01)

(56) References Cited

U.S. PATENT DOCUMENTS

| | | | |
|---|---|---|---|
| 5,839,508 A * | 11/1998 | Tubel | G01V 1/42 166/65.1 |
| 6,536,530 B2 | 3/2003 | Schultz et al. | |
| 6,640,625 B1 | 11/2003 | Goodwin | |
| 6,912,904 B2 | 7/2005 | Storm, Jr. et al. | |
| 6,945,095 B2 | 9/2005 | Johansen | |
| 6,951,252 B2 * | 10/2005 | Restarick | E21B 23/03 166/313 |
| 7,079,952 B2 | 7/2006 | Thomas et al. | |
| 7,549,319 B2 | 6/2009 | Headrick | |
| 9,008,977 B2 | 4/2015 | Gao | |
| 9,051,830 B2 | 6/2015 | Tips | |
| 9,279,317 B2 | 3/2016 | Lee | |
| 9,341,059 B2 | 5/2016 | Harrison et al. | |
| 9,388,686 B2 | 7/2016 | Konopczynski et al. | |
| 2002/0092650 A1 | 7/2002 | Tolman et al. | |
| 2002/0121371 A1 | 9/2002 | Moake et al. | |
| 2004/0055752 A1 | 3/2004 | Restarick et al. | |
| 2006/0162935 A1 | 7/2006 | MacDougall | |
| 2008/0262735 A1 | 10/2008 | Thigpen et al. | |
| 2010/0089141 A1 | 4/2010 | Rioufol et al. | |
| 2011/0088462 A1 | 4/2011 | Samson et al. | |
| 2012/0018167 A1 | 1/2012 | Konopczynski et al. | |
| 2013/0180330 A1 | 7/2013 | Gao et al. | |
| 2014/0076547 A1 | 3/2014 | Unalmis et al. | |
| 2014/0083682 A1 | 3/2014 | Grigsby et al. | |
| 2015/0059446 A1 | 3/2015 | Agar et al. | |
| 2015/0061669 A1 * | 3/2015 | Hakimuddin | G01R 33/28 324/309 |
| 2015/0285071 A1 | 10/2015 | Irani et al. | |
| 2016/0123111 A1 | 5/2016 | Kim et al. | |
| 2016/0208600 A1 * | 7/2016 | Gisolf | E21B 47/06 |
| 2016/0216187 A1 * | 7/2016 | Gao | G01N 11/00 |
| 2018/0217101 A1 | 8/2018 | Hopper et al. | |
| 2018/0335494 A1 * | 11/2018 | Hakimuddin | G01R 33/46 |
| 2020/0284128 A1 | 9/2020 | Lan et al. | |

FOREIGN PATENT DOCUMENTS

| | | |
|---|---|---|
| WO | 2012177241 A1 | 12/2012 |
| WO | 2017105420 A1 | 6/2017 |

OTHER PUBLICATIONS

International Searching Authority, Patent Cooperation Treaty, International Search Report and Written Opinion, International application No. PCT/US17/68495, entire document, which is a PCT parent to the instant application.

International Searching Authority, Patent Cooperation Treaty, International Search Report and Written Opinion, International application No. PCT/US17/68520, entire document, which is a PCT parent to the instant application.

Li Gao, Tony Van Zuilekom, Mickey Pelletier, Mark Proett, and Marvin Rourke, Halliburton and Richard Palmer, Andre Santos Da Silva, and A.A. Al-Hajari, Saudi Aramco, Improve Accuracy in the Measurement of Downhole in-situ Fluid Density, 2009 Society of Petroleum Engineers, 2009 SPE Annual Technical Conference and Exhibition, Oct. 4-7, 2009, pp. 1-21, New Orleans, Louisiana, USA.

Li Gao, Tony Van Zuilekom, Mickey Pelletier, Mark Proett, Sami Eyuboglu, and Bob Engelman, Halliburton, and Hani Elshahawi and Melton Hows, Shell, Sensitivity of a High-Resolution Fluid-Density Sensor in Multiphase Flow, SPE Annual Technical Conference and Exhibition, Society of Petroleum Engineers, pp. 1-19, Sep. 19-22, 2010, Florence, Italy.

M.Webster, SPE, and S. Richardson, SPE, BP Exploration; C. Gabard-Couq, Schlumberger Riboud Product Center; J.B. Fitzgerald, Schlumberger Cambridge Research; and K.E. Stephenson, SPE, Schlumberger-Doll Research, Well Surveillance With a Permanent Downhole Multiphase Flowmeter, Aug. 2006, Society of Petroleum Engineers, SPE Productions and Operations.

Machine Translation of Chinese Patent, CN 102797453 A, Well logging densimeter.

Lars Anders Ruden, Finding The Right Metering Solution for Middle East Fields, Metering Technology, Emerson Process Management, The Roxar 2600 Multiphase meter, pp. 26-28, Pipeline Mar. 2014, www.pipelineme.com.

Lars Anders Ruden, New Topsides, Subsea Technologies Tackle Flow Assurance Challenges, Emerson Process, Management, Offshore, Mar. 10, 2016.

GCC Application Serial No. GC 2018-36300; First Office Action; dated Jan. 29, 2020, 4 pages.

U.S. Appl. No. 16/341,556, Non-Final office action, dated Aug. 17, 2020, 15 pages.

GCC Application Serial No. GC 2018-36300; Second Office Action; dated Sep. 30, 2020, 4 pages.

U.S. Appl. No. 16/341,556, Final Office Action, dated Jan. 19, 2021, 14 pages.

Richard Thorn, Geir Anton Johansen, Erling a Hammer, Three-Phase Flow Measurement in the Offshore Oil Industry is There a Place for Process Tomography?, pp. 228-235, 1st World Congress on Industrial Process Tomography, Buxton, Greater Manchester, Apr. 14-17, 1999.

Simon Pedersen, Christian Mai, Leif Hansen, Petar Durdevic, and Zhenyu Yang, Online Slug Detection in Multi-phase Transportation Pipelines Using Electrical Tomography, pp. 165-170, Department of Energy Technology, Aalborg University Esbjerg, Niels Bohrs Vej 8, 6700 Esbjerg, Denmark (E-mail: spe@et.aau.dk), 2nd IFAC Workshop on Automatic Control in Offshore Oil and Gas Production,May 27-29, 2015, Florianpolis, Brazil.

Yiming Deng and Xin Liu, Electromagnetic Imaging Methods for Nondestructive Evaluation Applications, Sensors ISSN 1424-8220, www.mdpi.com/journal/sensors, p. 11774-11808, Received: Aug. 29, 2011; in revised form: Dec. 8, 2011/Accepted: Dec. 8, 2011 /Published: Dec. 19.

* cited by examiner

| Measure a property of a fluid flowing through one of a plurality of passages in a valve |
|---|

~1202

| Determine a fraction of a subject fluid in a fluid flowing through into the one of the plurality of passages using a density of oil, a density of the subject fluid, and the measured property |
|---|

~1204

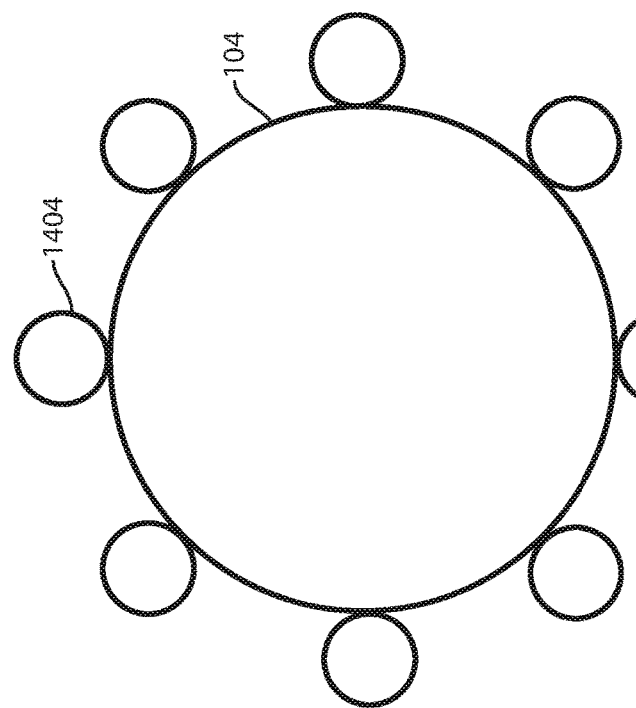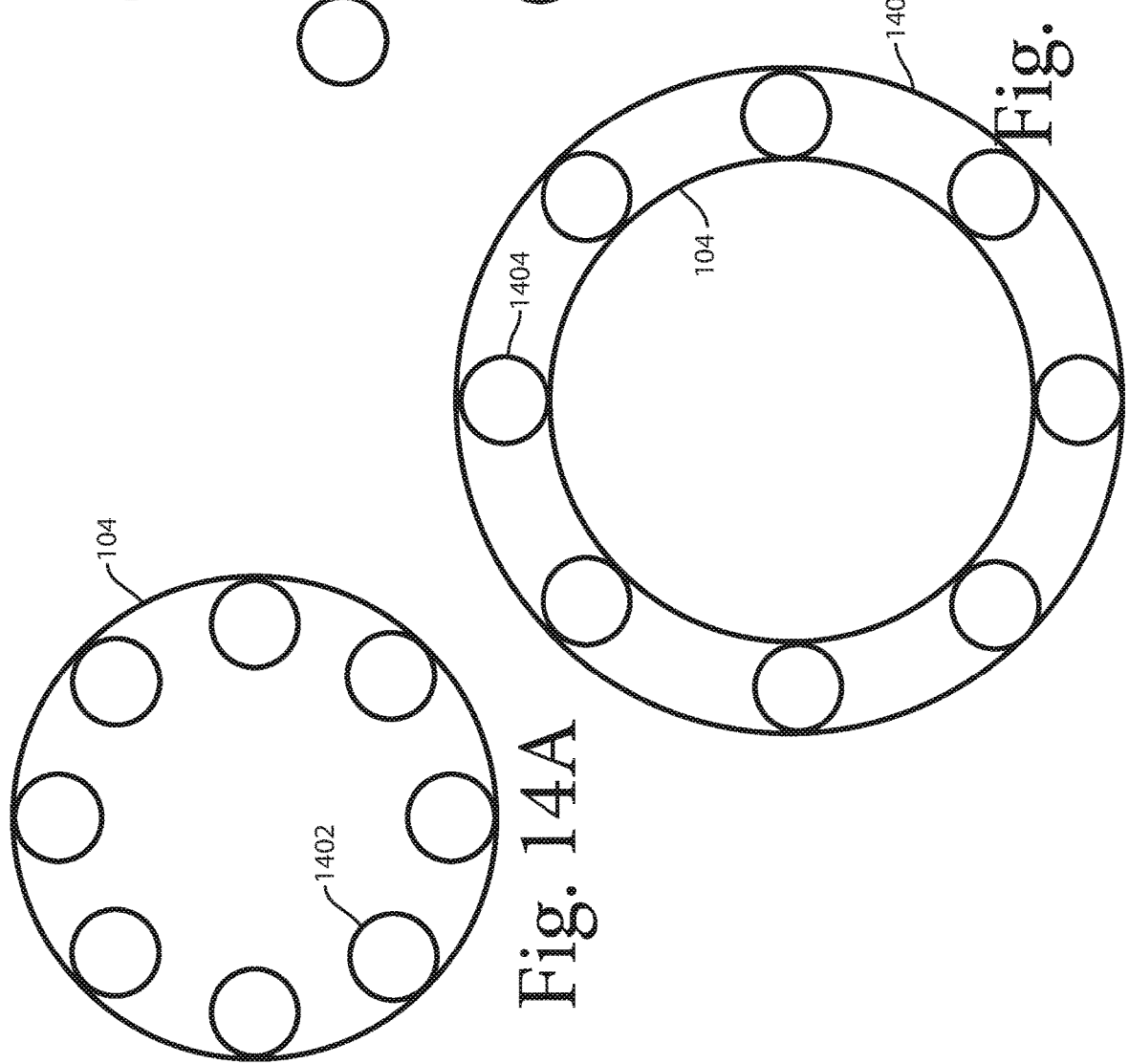

DETECTING A FRACTION OF A COMPONENT IN A FLUID

BACKGROUND

A well may produce fluids with a high percentage of oil, or other desired hydrocarbons, when it is first completed. Over time, however, the quantity of undesirable fluids (for example, water or natural gas) in the produced fluids increases. In multi-zone wells, it is possible that undesirable fluids are produced from only a few of the zones and that the quality of the fluids produced from the well could be improved by limiting or eliminating the fluids produced from those zones. It is a challenge to determine the fraction of undesirable fluids (i.e., the "cut") in fluids produced from zones in a well to determine which zones should be restricted in production to improve the quality of production from the well.

BRIEF DESCRIPTION OF THE DRAWINGS

FIG. 14A is a cross-sectional view of a valve or production tubing showing the use of a plurality of in-line densitometers and flow meters to determine holdup.

FIG. 14B is a cross-sectional view of a valve or production tubing showing the use of a plurality of densitometers and flow meters inside tubes to determine holdup.

FIG. 14C is a cross-sectional view of a valve or production tubing showing the use of a plurality of densitometers and flow meters in shrouded side tubes to determine holdup.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Figure 1:
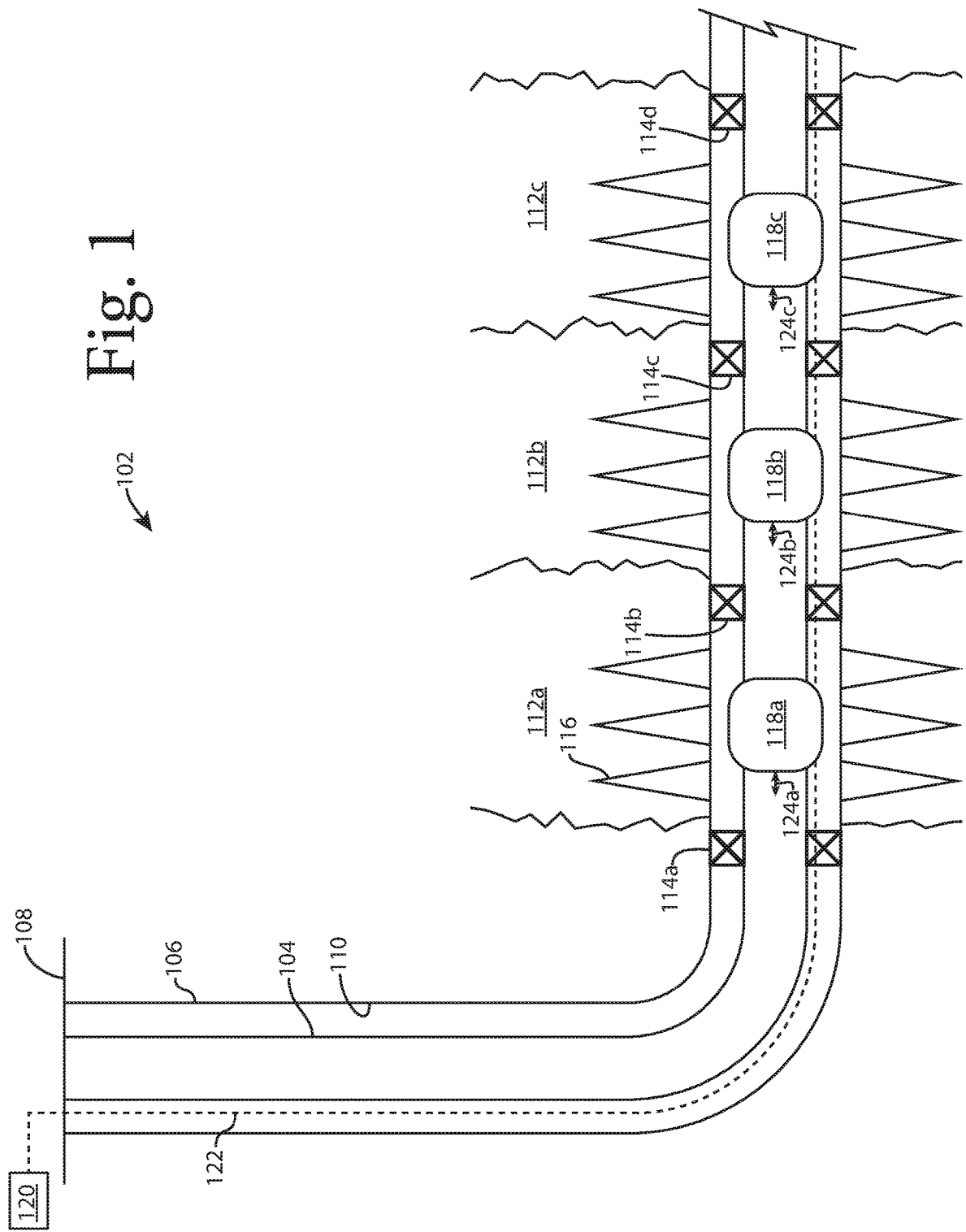
FIG. 1 is a schematic of a production system.

FIG. 1 is a schematic of a production system. A production system 102 includes production tubing 104 that carries hydrocarbons and/or other products from a well 106 to the surface 108. The well 106 includes a borehole 110 that penetrates zones 112a, 112b, 112c, etc. separated by packers 114a, 114b, 114c, 114d, etc. Hydrocarbons and/or other products enter the borehole 110 through perforations 116 (only one is labeled). The hydrocarbons enter the production tubing through respective controllable inflow valves 118a, 118b, 118c, etc. A controller 120 is connected to the valves 118a, 118b, 118c, etc. via control line 122 and controls the degree to which the valves 118a, 118b, 118c, etc. are open via the same control line 122. The control line 122 may be a hydraulic control line. The controller 120 may be at the surface, as shown in FIG. 1. The controller 120 may be below the surface 108 near or attached to one or more of the valves 118a-c.

Figure 2:
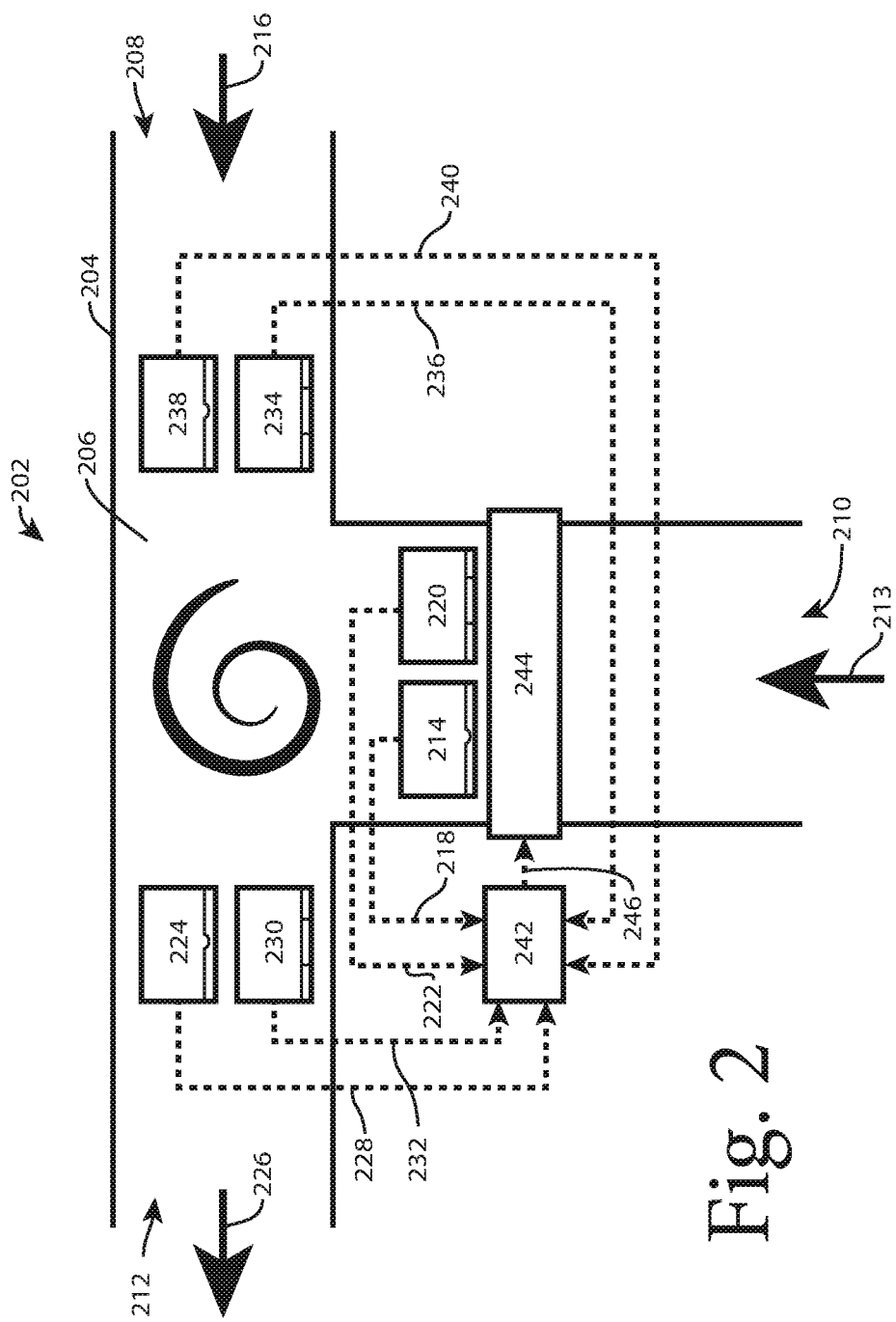
FIG. 2 is a schematic of a controllable inflow valve.

FIG. 2 is a schematic of a controllable inflow valve 202. The valve 202, with various combinations of components described in connection with FIG. 2 as discussed below in connection with FIGS. 6 through 12, is representative of any of the controllable inflow valves 118a, 118b, 118c, etc. The valve 202 includes a valve body 204. The valve body 204 contains a chamber, which, for the purposes of this disclosure, is a mixing chamber and will be referred to herein by the term "mixing chamber 206." The valve 202 includes an upstream fluid input 208 to the mixing chamber 206, an inflow fluid input 210 to the mixing chamber 206, and a fluid output 212 from the mixing chamber 206. The upstream fluid input 208 may be coupled to the production tubing 104 to receive fluid from upstream components (not shown), the inflow fluid input 210 receives fluid from the borehole 110 around the valve 202, and the fluid output 212 delivers fluid into the production tubing 104 for transportation to downstream components (not shown) and eventually to the surface 108. Fluid 216 entering the valve 202 through the upstream fluid input 208 mixes in the mixing chamber 206 with fluid 213 entering the valve through the inflow fluid input 210, to produce output fluid 226.

The valve 202 may include an inflow flow meter 214 to measure a volumetric flow rate of the fluid 213 flowing into the inflow fluid input 210 and to produce an inflow flow meter output 218 representing the measured volumetric flow rate of the fluid 213 flowing into the inflow fluid input 210. In this context, "to measure" or "measuring" is defined to receiving raw input from sensors, such as the inflow flow meter 214 and other similar devices described herein, converting the raw input from analog to a digital format, if necessary, and processing the resulting digital data as necessary to produce the specified output.

The valve 202 may include an inflow densitometer 220 to measure a density of the fluid 213 flowing into the inflow fluid input 210 and to produce an inflow densitometer output 222 representing the measured density of the fluid 213 flowing into in the inflow fluid input 210.

Note that, for clarity and ease of reference, the symbol for a flow meter, such as the inflow flow meter 214, includes a stylized representation of a flow meter at the bottom of a rectangular box and the symbol for a densitometer, such as inflow densitometer 220 includes a stylized representation of a densitometer at the bottom of a rectangular box.

The valve 202 may include an output densitometer 230 to measure a density of the fluid 226 flowing out of the fluid output 212 and to produce an output densitometer output 232 representing the measured density of the fluid 226 flowing out of the fluid output 212.

The valve 202 may include an output flow meter 224 to measure a volumetric flow rate of a fluid 226 flowing from the mixing chamber 206 out of the fluid output 212 and to produce an output flow meter output 228 representing the measured volumetric flow rate of the fluid 226 flowing out of the fluid output 212.

The valve 202 may include an upstream densitometer 234 to measure a density of the fluid 216 flowing into the upstream fluid input 208 and to produce an upstream densitometer output 236 representing the measured density of the fluid 216 flowing into the upstream fluid input 208.

The valve 202 may include an upstream flow meter 238 to measure a volumetric flow rate of the fluid 216 flowing into the upstream fluid input 208 and to produce an upstream flow meter output 240 representing the measured volumetric flow rate of the fluid 216 flowing into the upstream fluid input 208.

The valve 202 includes a computer 242, which, may be coupled to the inflow flow meter output 218, the inflow densitometer output 222, the output flow meter output 228, the output densitometer output 232, the upstream densitometer output 236, and the upstream flow meter output 240. The computer 242 is programmed to use a subset of those outputs along with a density of oil and a density of a subject fluid to determine a fraction of the subject fluid in a fluid flowing in one or more of the inflow fluid input 210, upstream fluid input 208, or the fluid output 212.

The inflow flow meter 214, the inflow densitometer 220, the output flow meter 224, the output densitometer 230, the upstream flow meter 238, and the upstream densitometer 234 may be attached to the valve body 204.

The subject fluid could be water, could be gas, and/or could be oil. The subject fluid may be a mixture of two or more of water, gas, and oil.

The fluid 216 in the upstream fluid input 208 and a fluid 213 in the inflow fluid input 210 are mixed in the mixing chamber 206 to produce in the fluid output 212 a well-mixed combination of the fluid 216 in the upstream fluid input 208 and the fluid 213 in the inflow fluid input 210. The term "well-mixed" is defined to mean that different phases in the fluid described as "well-mixed" are homogenously distributed in the fluid and move through the production tubing 104 at the same velocity. For example, a well-mixed combination of oil and water would have the oil and water homogenously mixed.

Returning to FIG. 1, an output tubular, such as the production tubing 104, is coupled to the fluid output 212. The output flow meter 224 and the output densitometer 230, are positioned within a well-mixed range 124a, 124b, 124c, etc. of the mixing chamber 206 such that the output flow meter 224 measures the volumetric flow rate of the fluid 226 flowing out of the fluid output 212 and the output densitometer 230 measures the density of the fluid 226 flowing out of the fluid output 212 in the output tubular (i.e., production tubing 104) within a well-mixed range 124a, 124b, 124c, etc. of the mixing chamber 206 in the respective valve 118a, 118b, 118c, etc. The term "well-mixed range" is defined to mean the distance over which flowing fluid remains well-mixed and is typically in a range of 0 to 10 times the internal bore diameter of the fluid output 212. The well-mixed range 124a, 124b, 124c, etc. may be outside the respective valve 118a, 118b, 118c, etc., as shown in FIG. 1. The well-mixed range 124a, 124b, 124c, etc. may be inside the respective valve 118a, 118b, 118c, etc. The well-mixed range 124a, 124b, 124c, etc. may be partially outside the respective valve 118a, 118b, 118c, etc. and partially inside the respective valve 118a, 118b, 118c. The well-mixed range may be three feet (0.91 meters). The well-mixed range may be 1 foot (0.30 meters). The well-mixed range may be three inches (7.62 centimeters).

The valve 202 includes a controllable inflow valve 244, shown in FIG. 2, to control the amount of fluid 213 entering the mixing chamber 206 through the inflow fluid input 210. The controllable inflow valve 244 may be similar to the Interval Control Valve ("ICV") available from Halliburton. The controllable inflow valve 244 is controlled by the computer 242 by way of control line 246. The controllable inflow valve 244 can be commanded to be open, closed, or open by a controllable amount between open and closed. The controllable inflow valve 244 can be opened in 10 increments (i.e., 10 percent open, 20 percent open, 30 percent open, 40 percent open, 50 percent open, 60 percent open, 70 percent open, 80 percent open, 90 percent open, and 100 percent open).

The inflow flow meter 214, the output flow meter 224, and the upstream flow meter 238 may include Venturi devices, such as the FLOSTREAM™ Venturi flow meters available from Halliburton, that measure flow using the Venturi effect. Other types of flow meters, such as those that determine flow rate from the pressure on either side of an orifice, may be used.

The inflow densitometer 220, the output densitometer 230, and the upstream densitometer 234 may include a vibrating tube densitometer, such as those described in U.S. Pat. No. 9,008,977, entitled Determining Fluid Density." which is assigned to the assignee of the instant application. Such vibrating tube densitometers use measured vibration frequencies of a tubular sample cavity filled with a liquid to determine properties, including density, of the fluid. More specifically, by using an excitation source, and measuring the resulting resonant frequency of the combined fluid and tube assembly, the total mass, consisting of the mass of the tube and the fluid flowing through it, can be calculated as the mass density of the fluid changes. Therefore, by monitoring the resonant frequencies of the vibrating tube, it is possible to measure the density of the fluid mass.

Figure 3:
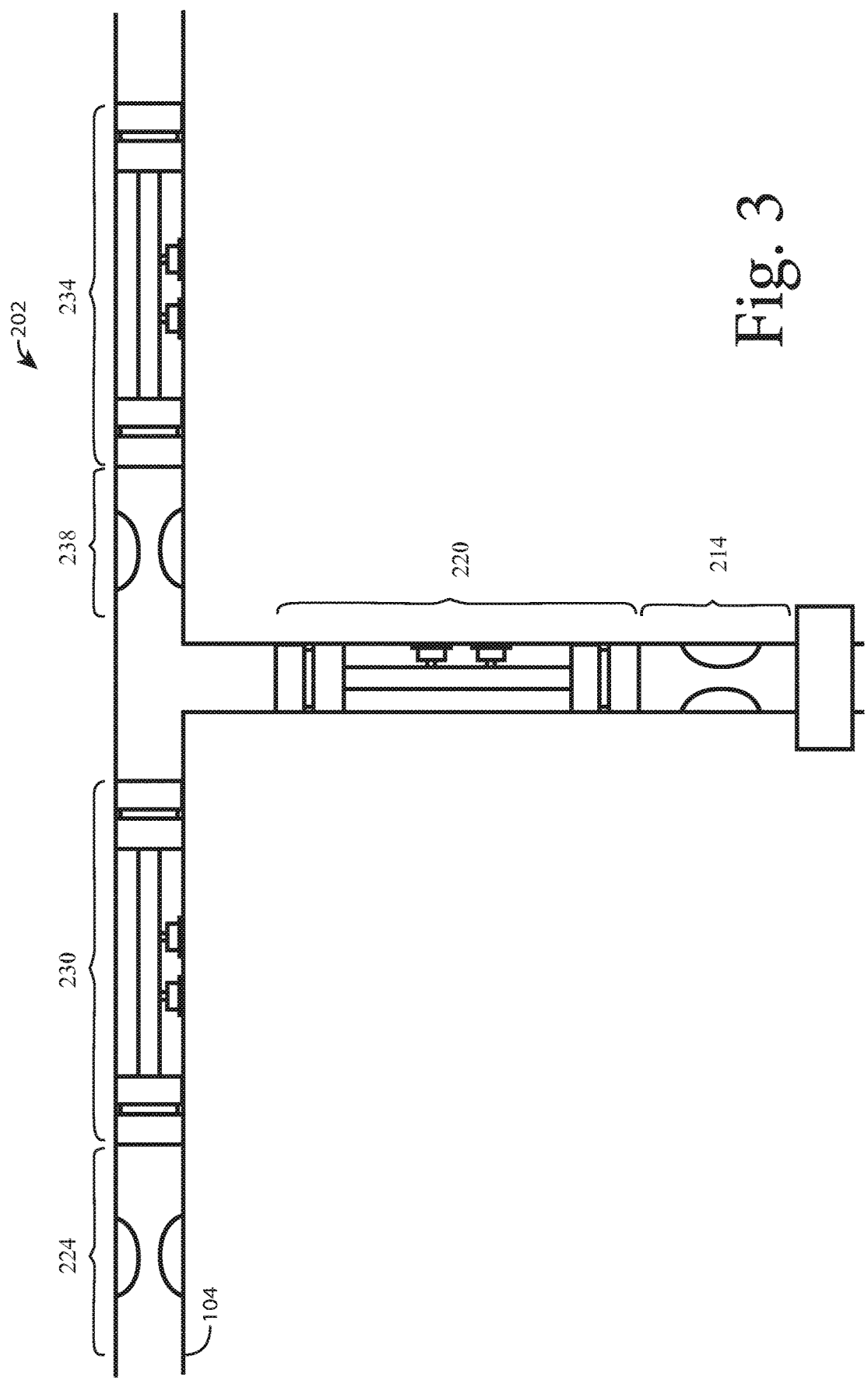
FIG. 3 is a schematic of a valve with in-line densitometers and flow meters.

FIG. 3 is a schematic of a valve with in-line densitometers and flow meters. The upstream densitometer 234, the upstream flow meter 238, the output densitometer 230, and the output flow meter 224 may be in-line with the production tubing 104. The inflow flow meter 214, the inflow densitometer 220, the output flow meter 224, the output densitometer 230, the upstream flow meter 238, and the upstream densitometer 234 may be permanently installed in a zone, or inserted as needed within a zone using a wireline, Slickline, or tubing tool, depending on requirements from the operator, cost considerations, and specific conditions of the field.

The production tubing 104 may act as the tube in a vibrating-tube densitometer with the packers 114a, 114b, 114c, etc. forming the anchor points for the tube. Such embodiments may not have flow meters. A vibration emitter may be formed from a magnet that may be attached to the vibrating tube and generates a time-dependent electromagnetic force (EMF) from the magnetic flux change experienced by a magnetic coil interacting with the moving magnet. Other vibration emitters may include piezoelectric sources, mechanical hammers/tappers, microexplosions, or the flow of the fluid itself. Vibration detectors or vibration sensors that may be included in the densitometers 220, 230, and 234 may include accelerometers, optical sensors (fiber Bragg grating point sensors, reflectometers, Sagnac coils, distributed acoustic sensors, or distributed strain sensors), piezoelectric or flexoelectric sensors, and electric strain gauges (resistive or capacitive).

The temperature and pressure within the densitometer may be measured in-situ in order to provide more accurate calculation of the fluid density, and hence water cut. Additional methods to improve the calculation are using pressure, volume, temperature (PVT) data provided by the operator or by optimizing the excitation signal and sensing signal pickup.

Phases that have experienced separation can still be estimated by measuring multiphase flow rates using cross-correlation methods. For example, by using two densitometers at differing locations and monitoring their time series of changing density data, the speed at which a change in material density occurs can be calculated. By knowing the density of pure fluid phases, the measured change in density can be correlated to a change in water cut; by knowing the speed this change propagated, the flow rate of the changing phase can be estimated as well.

Figure 4:
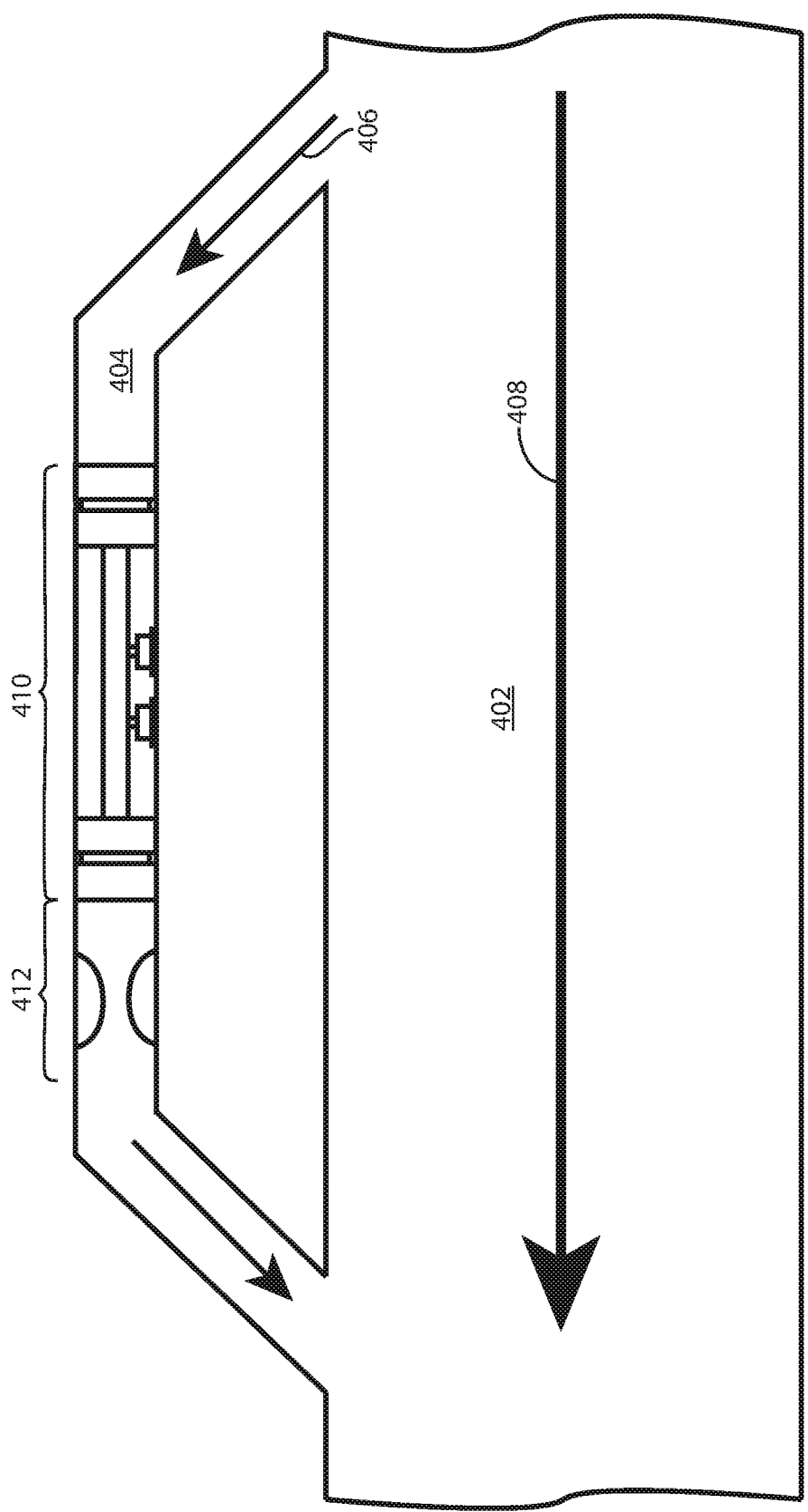
FIG. 4 is a schematic of a valve with a densitometer and a flow meter in a side tube.

FIG. 4 is a schematic of a densitometer and a flow meter in a side tube. The valve body 204 may include a main channel 402, which may be part of or connected to the upstream fluid input 208, the inflow fluid input 210, or the fluid output 212. The valve body 204 may include a side tube 404 into which a portion 406 of the fluid 408 in the main channel 402 is diverted. A densitometer 410 may measure a density of the fluid 408 in the side tube 404. A flow meter 412 may measure a rate of flow of the fluid 406 flowing through the side tube 404 and that rate of flow is used to extrapolate the rate of flow of fluid 408 through the main channel 402.

The valve 202 may have a plurality of side tubes 404, each with a flow meter 412 and densitometer 410, placed at different azimuthal positions around the main channel 402 (see e.g., FIGS. 14A-14C discussed below).

Figure 5:
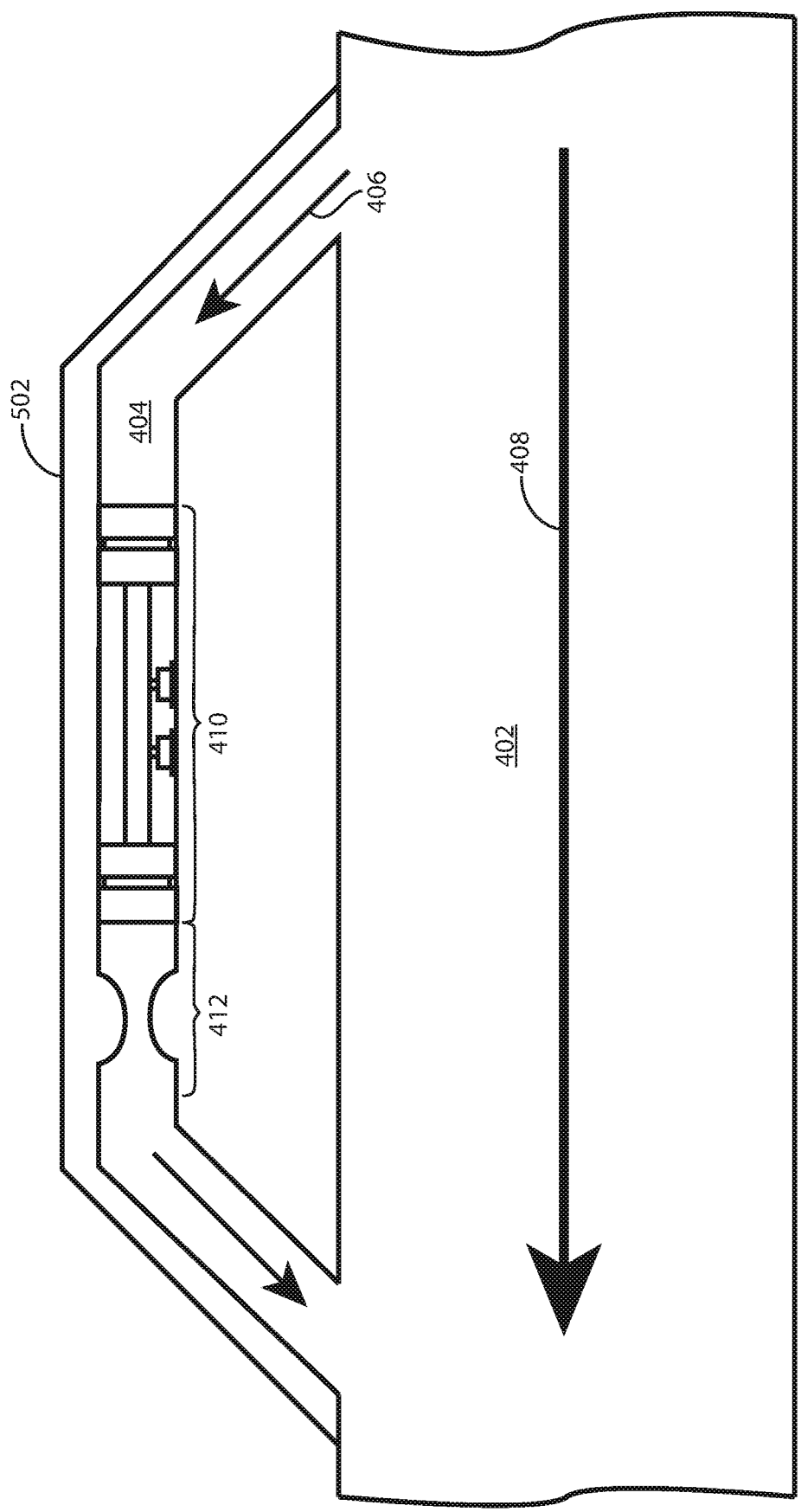
FIG. 5 is a schematic of a valve with a densitometer and a flow meter in a side tube with a pressure-holding shroud.

FIG. 5 is a schematic of a densitometer and a flow meter in a side tube with a pressure-holding shroud. The arrangement shown in FIG. 4 may augmented by adding a pressure-holding shroud 502 around the densitometer 410 and the flow meter 412 to keep constant the pressure around the densitometer 410. The pressure-holding shroud 502 may contain a fluid at a pre-determined pressure. The pressure-holding shroud 502 may keep constant an acoustic impedance around the input densitometer.

The valve 202 may have a plurality of side tubes 404, each with a flow meter 412 and a densitometer 410, placed at different azimuthal positions around the main channel 402 and with all of the side tubes covered by pressure holding shroud 502 (see e.g., FIG. 14C discussed below)

Referring to FIGS. 1 and 2, a system may include the production tubing 104 penetrating an upper zone, e.g., 112a, and a lower zone, e.g., 112b, in the well 106. A lower zone valve 118b has a lower zone inflow fluid input 210 coupled to the lower zone 112b by which fluids from the lower zone 112b enter the lower zone valve 118b. The lower zone valve 118b has a lower zone fluid output 212 by which fluid 226 from the lower zone valve 118b enters the production tubing 104. The lower zone valve 118b has a lower zone control (i.e., controllable inflow valve 244) to control the amount of fluid 213 from the lower zone 112b that enters the production tubing 104. The lower zone valve 118b includes a lower zone cut computer 242 to measure a fraction of a subject fluid in a fluid 213 flowing into the lower zone inflow fluid input 210.

The system includes an upper zone valve 118a having a first upper zone input 208 (the features shown in FIG. 2 are common to the lower zone valve 118b, described above, and the upper zone valve 118a) coupled to the lower zone fluid output 212 of the lower zone valve 118b through the production tubing 104. The upper zone valve 118a includes an upper zone inflow fluid input 210 coupled to the upper zone 112a by which fluids from the upper zone 112a enter the upper zone valve 118a. The upper zone valve 118a has an upper zone fluid output 212 by which fluid from the upper zone valve 118a enters the production tubing 104. The upper zone valve 118a has an upper zone control (i.e., controllable inflow valve 244) to control the amount of fluid 213 from the upper zone 112a that enters the production tubing 104. The upper zone valve 118a has an upper zone cut computer 242 to measure a fraction of the subject fluid in a fluid 213 flowing into the upper zone inflow fluid input 210.

The system includes a subject fluid controller 120 (see FIG. 1) coupled to the lower zone control (the controllable inflow valve 244 associated with the lower zone valve 118b) and the upper zone control (the controllable inflow valve 244 associated with the upper zone valve 118a) to control the amount of fluid from the lower zone 112b that enters the production tubing 104 and amount of fluid from the upper zone 112a that enters the production tubing 104 based on the fraction of the subject fluid in a fluid flowing into the lower zone inflow fluid input 210 associated with lower zone valve 118b and the fraction of the subject fluid in a fluid flowing into the upper zone inflow fluid input 210 associated with the upper zone valve 118a.

The subject fluid controller 120 may be distributed among the upper zone cut computer 242 associated with the upper zone valve 118a and the lower zone cut computer 242 associated with the lower zone valve 118b. That is, the decision making regarding the amount of fluid to enter the production tubing 104 from the upper zone 112a and the lower zone 112b may be performed partly by software in the upper zone cut computer 242 associated with the upper zone valve 118a and partly by the lower zone cut computer 242 associated with the lower zone valve 118b. All the decision making regarding the amount of fluid entering the production tubing 104 from the upper zone 112a and from the lower zone 112b may be performed by software in the upper zone cut computer 242 associated with the upper zone valve 118a or by the lower zone cut computer 242 associated with the lower zone valve 118b.

Figure 6:
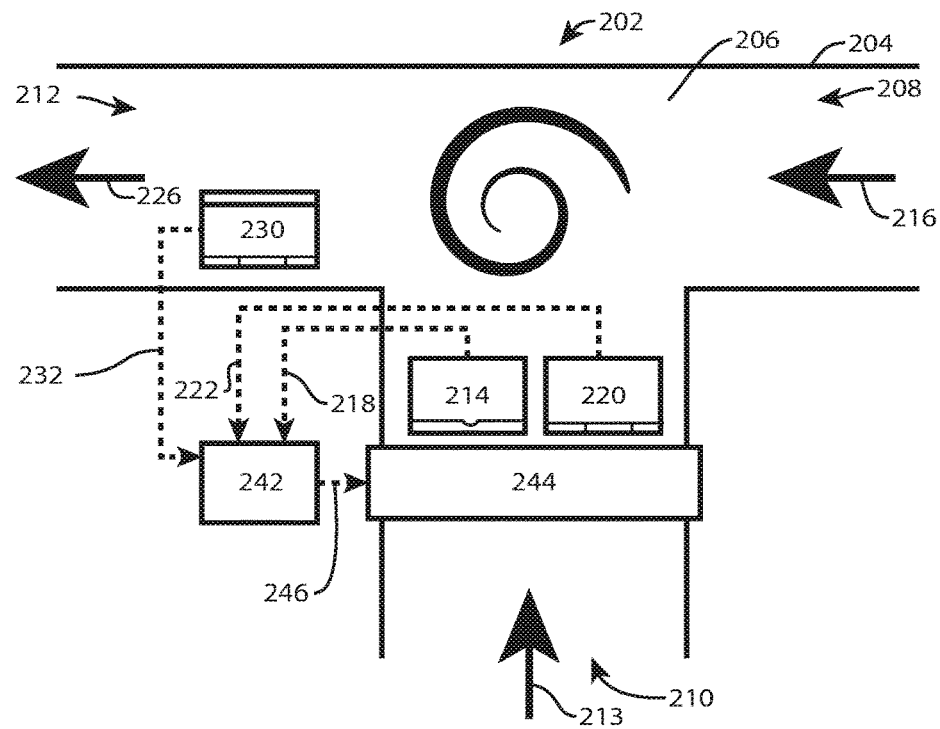
FIG. 6 is a schematic of a controllable inflow valve.

FIG. 6 is a schematic of a controllable inflow valve. The valve 202 may be a version of the valve 202 shown in FIG. 2 without the output flow meter 224, the upstream densitometer 234 and the upstream flow meter 238. Further, the output densitometer 230 is in a side tube, such as densitometer 410 inside tube 404. Herein, elements inside tubes are indicated by bars across the top edge of the rectangular box representing the element.

In the embodiment shown in FIG. 6, the fraction of the subject fluid 213 flowing into the inflow fluid input 210 is computed using equation (1) below:

$$\Phi_A = \frac{\rho_A - \rho_O}{\rho_S - \rho_O}$$

where $\phi_A$ is the calculated fraction of the subject fluid in the fluid 213 flowing into the inflow fluid input 210; $\rho_A$ is the inflow densitometer 220 output 222 representing the measured density of the fluid 213 flowing into the inflow fluid input 210; $\rho_o$ is the density of oil, and $\rho_s$ is the density of the subject fluid.

Similarly, the fraction of the subject fluid flowing out of the fluid output 212 is computed using equation (2) below:

$$\Phi_{Output} = \frac{\rho_{Output} - \rho_O}{\rho_S - \rho_O}$$

where $\phi_{Output}$ is the calculated fraction of the subject fluid in the fluid 226 flowing out of the fluid output 212; $\rho_{Output}$ is the measured density 232 of the fluid 226 flowing out of the fluid output 212; $\rho_o$ is defined above in connection with equation (1), and $\rho_s$ is defined above in connection with equation (1).

$\phi_A$ from each controllable intake valve 118a-c can be used, along with the inflow flow meter output 218 representing the measured volumetric flow rate of the fluid 213 flowing into the inflow fluid input 210 from each zone 112a-c to determine the contribution of each zone to the fraction of the subject fluid produced from the well 106 at the surface 108.

Figure 7:
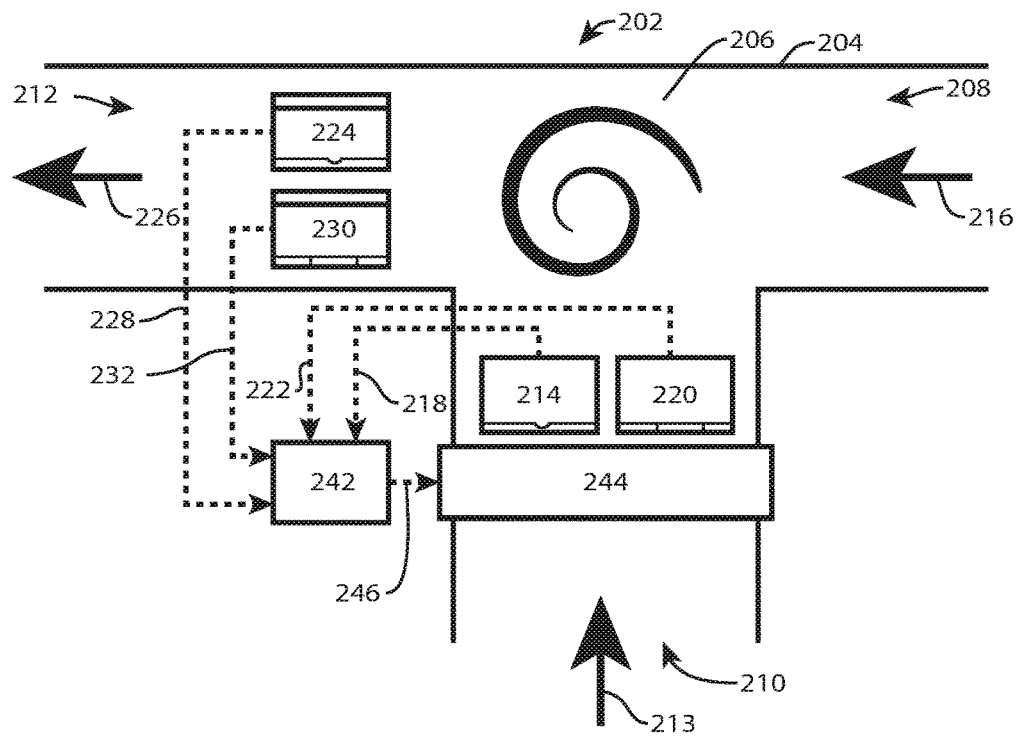
FIG. 7 is a schematic of a controllable inflow valve.

FIG. 7 is a schematic of a controllable inflow valve. The valve 202 may be a version of the valve 202 shown in FIG. 2 without the upstream densitometer 234 and the upstream flow meter 238. The output flow meter 224 may be a removable venturi device and the output densitometer 230 is in a side tube. Further, the output flow meter 224 and the output densitometer 230 are in a side tube either together, as shown in FIGS. 3, 4, and 5, or separately. $\phi_A$ may be calculated using equation (1) and $\phi_{Output}$ may be calculated using equation (2).

Figure 8:
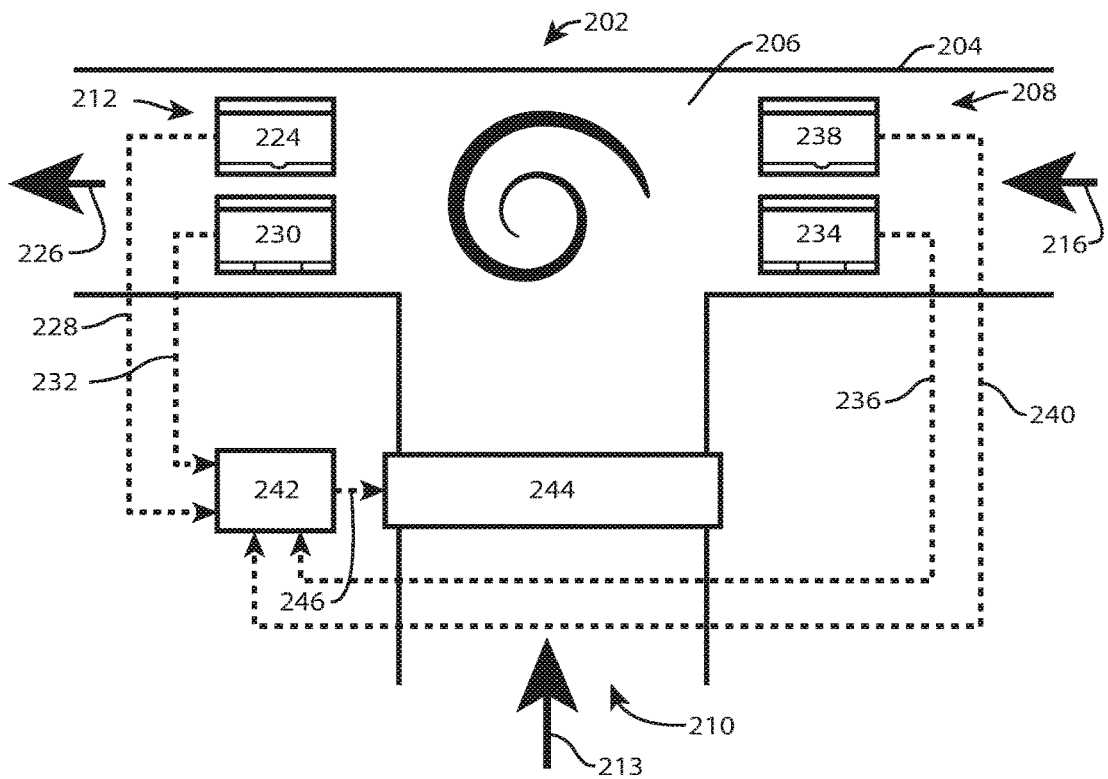
FIG. 8 is a schematic of a controllable inflow valve.

FIG. 8 is a schematic of a controllable inflow valve. The valve 202 may be a version of the valve 202 shown in FIG. 2 without the inflow densitometer 220 and the inflow flow meter 214. The output flow meter 224 and the output densitometer 230 are in a side tube either together, as shown in FIGS. 3, 4, and 5, or separately. The upstream flow meter 238 and the upstream densitometer 234 are in a side tube either together, as shown in FIGS. 3, 4, and 5, or separately. $\phi_{Output}$ may be calculated using equation (2) and $\phi_A$ may be calculated using equation (3) below:

$$\Phi_A = \frac{Q_{Output}(\rho_{Output} - \rho_O) - Q_{up}(\rho_{up} - \rho_O)}{(Q_{Output} - Q_{up})(\rho_S - \rho_O)}$$

where $\phi_A$ is defined above in connection with equation (1); $Q_{Output}$ is the output flow meter 224 output 228 representing the measured volumetric flow rate of the fluid 226 flowing out of the fluid output 212; $\rho_{Output}$ is defined above in connection with equation (2); $Q_{up}$ is the upstream flow meter 238 output 240 representing the measured volumetric flow rate of the fluid 216 flowing into the upstream fluid input 208; $\rho_{up}$ is the upstream densitometer 234 output 236 representing the measured density of the fluid 216 flowing into the upstream fluid input 208; $\rho_o$ is defined above in connection with equation (1); and $\rho_s$ is defined above in connection with equation (1).

Figure 9:
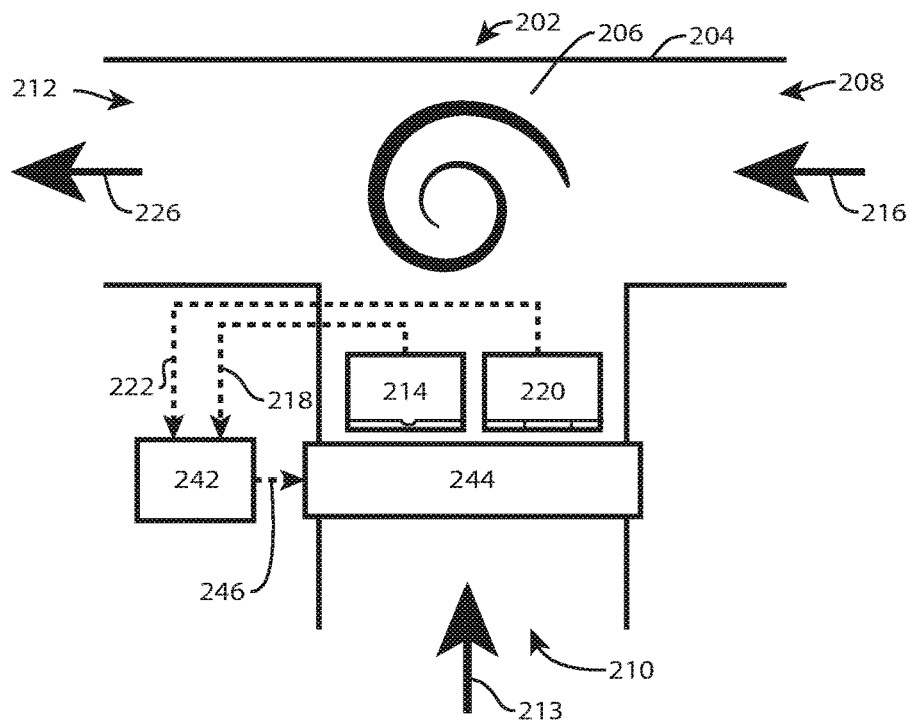
FIG. 9 is a schematic of a controllable inflow valve.

FIG. 9 is a schematic of a controllable inflow valve. The valve 202 may be a version of the valve 202 shown in FIG. 2 without the output flow meter 224, the output densitometer, the upstream densitometer 234, and the upstream flow meter 238. $\phi_A$ may be calculated using equation (1).

Figure 10:
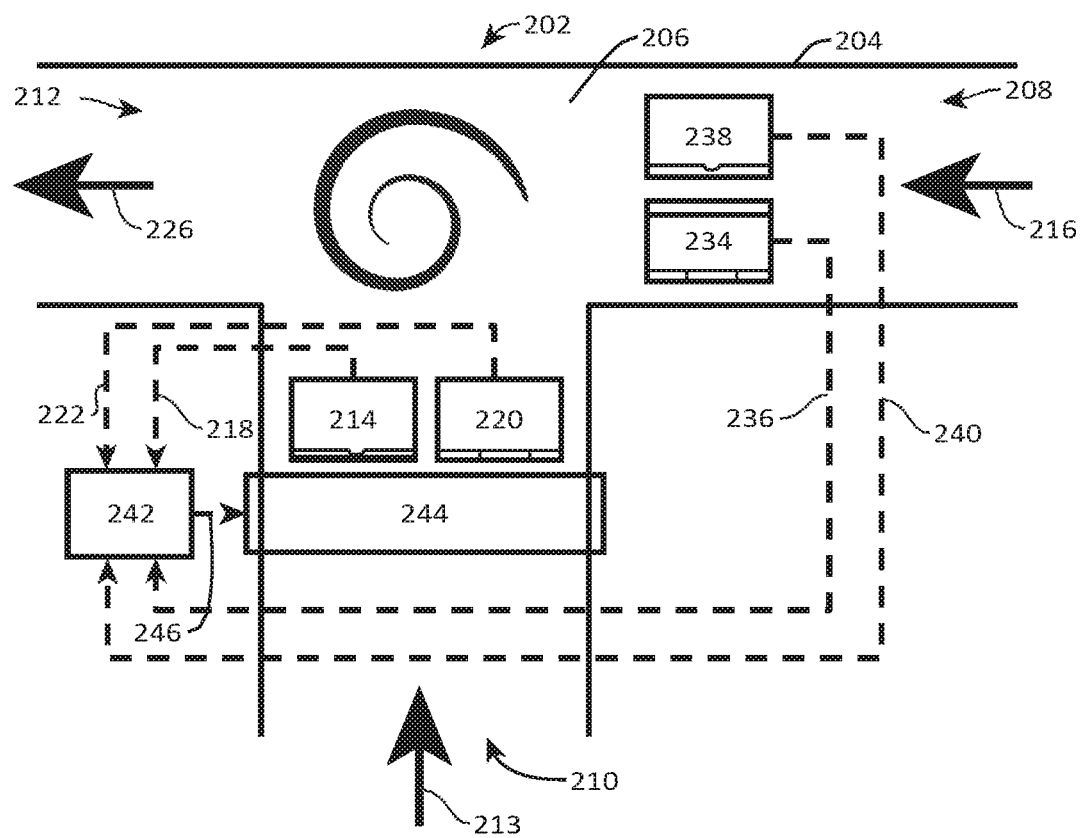
FIG. 10 is a schematic of a controllable inflow valve.

FIG. 10 is a schematic of a controllable inflow valve. The valve 202 may be a version of the valve 202 shown in FIG. 2 without the output densitometer 230 and the output flow meter 224. The output flow meter 224 may be a removable venturi device and the output densitometer 230 is in a side tube. $\phi_A$ may be calculated using equation (1).

Figures 11, 12:
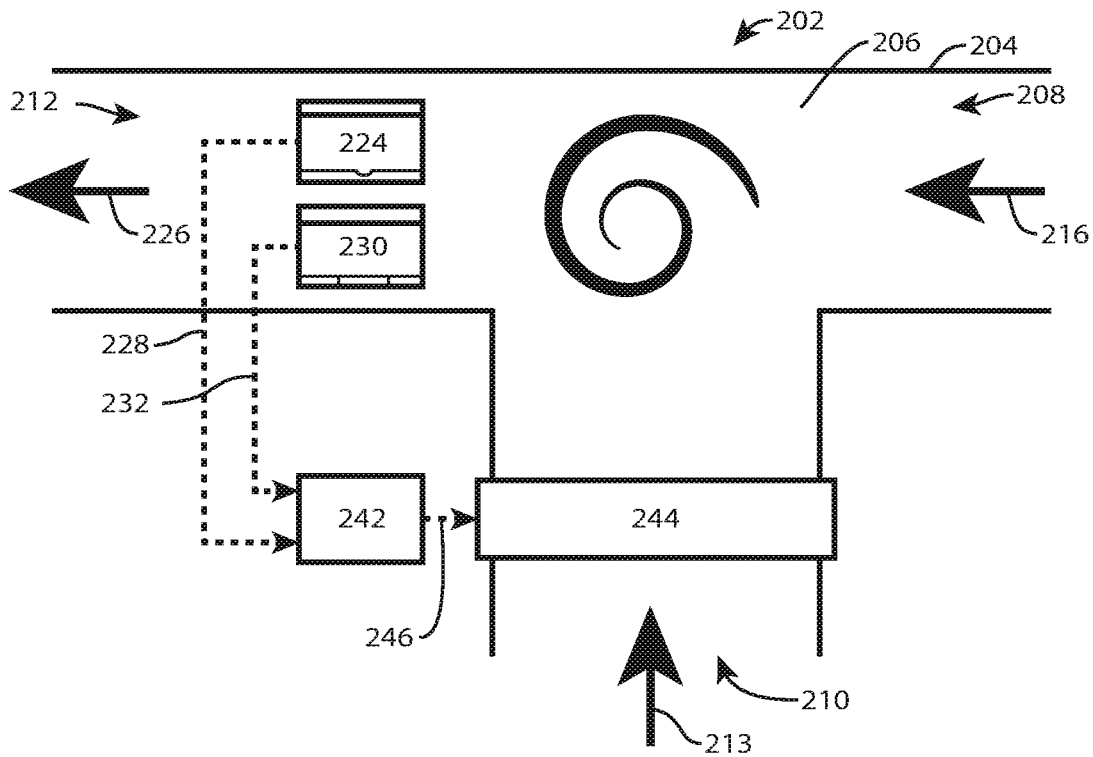
FIG. 11 is a schematic of a controllable inflow valve.
FIG. 12 is a flow chart describing a method for determining a fraction of a subject fluid in a fluid.

FIG. 11 is a schematic of a controllable inflow valve. The valve 202 may be a version of the valve 202 shown in FIG. 2 without the upstream densitometer 234, the upstream flow meter 238, the inflow densitometer 220, and the inflow flow meter 214. The output flow meter 224 and the output densitometer 230 may be in a side tube either together, as shown in FIGS. 3, 4, and 5, or separately. $\phi_{Output}$ may be calculated using equation (2).

$\phi_A$ from each controllable intake valve 118a-c in any of the configurations shown in FIGS. 6-11 can be used, along with the inflow flow meter output 218 representing the measured volumetric flow rate of the fluid 213 flowing into the inflow fluid input 210 from each zone 112a-c to determine the contribution of each zone to the fraction of the subject fluid produced from the well 106 at the surface 108.

$\phi_{Output}$ from each controllable intake valve 118a-c in any of the configurations shown in FIGS. 6-8, 10 and 12 can be used, along with the output flow meter output 228 representing the measured volumetric flow rate of the fluid 226 flowing out of the fluid output 212 from each zone 112a-c to determine the contribution of each zone to the fraction of the subject fluid produced from the well 106 at the surface 108.

Note that if a zone is not producing, there is no need to measure the fraction of subject fluid produced from the non-producing zone. For example, if zone 112b in FIG. 1 is not producing the contribution of zones 112b and 112a to the fraction of the subject fluid can be determined at zone 112a.

FIG. 12 is a flow chart describing a method for determining a fraction of a subject fluid in a fluid. The method includes measuring a property of a fluid flowing through one of a plurality of passages in a valve (block 1202). The method further includes determining a fraction of a subject fluid in a fluid flowing through into the one of the plurality of passages using a density of oil, a density of the subject fluid, and the measured property (block 1204).

The density of oil may be determined from oil produced from a well 106 in which the valve 202 is installed when the well 106 first begins producing oil.

The technique described herein allows the determination of the fraction of the subject fluid from 0 percent to 100 percent in both vertical and horizontal wells.

Examples of Use

Figure 13:
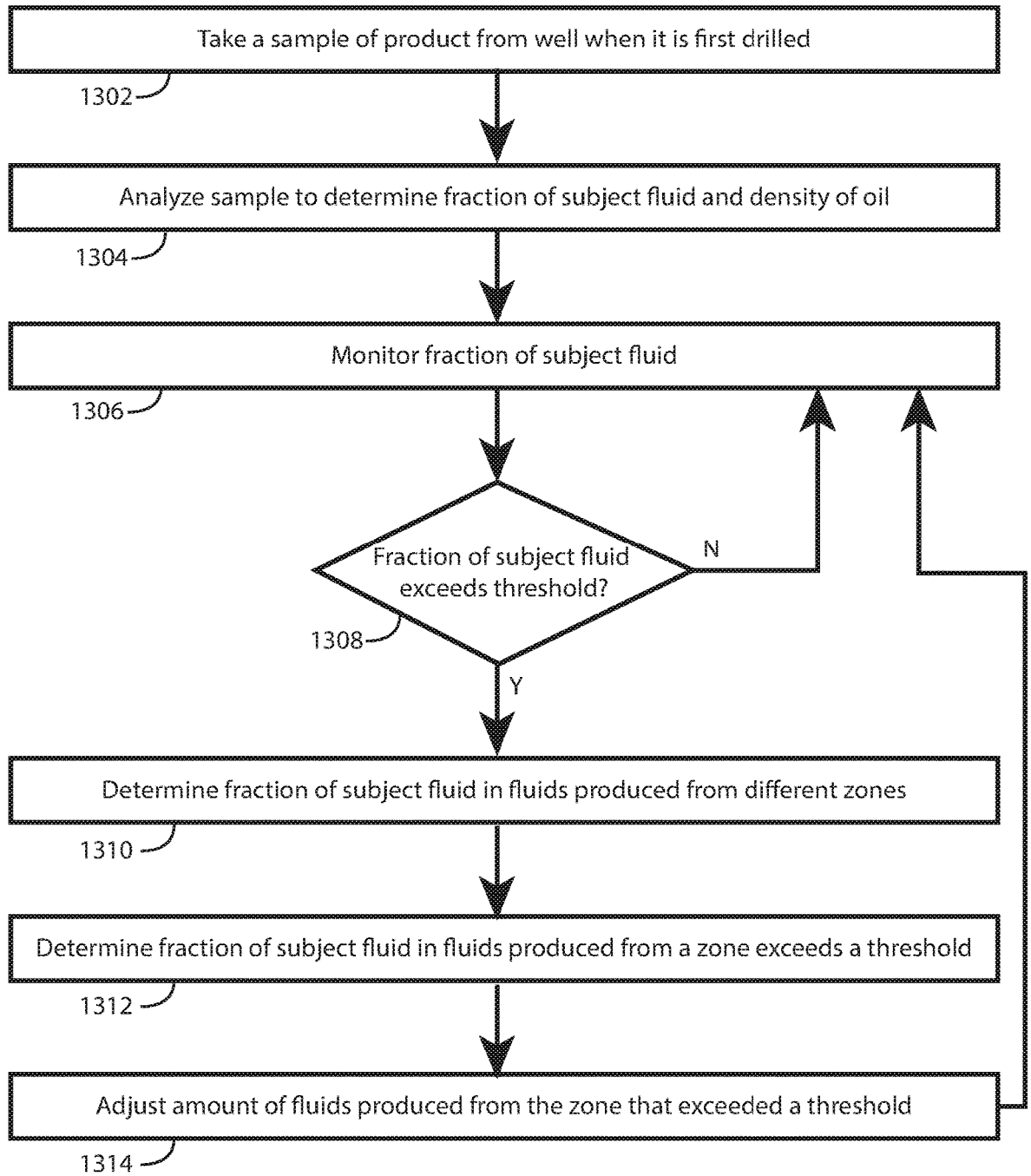
FIG. 13 is a flow chart showing a method for controlling a fraction of a subject fluid in fluids produced from a well.

FIG. 13 is a flow chart showing a method for controlling a fraction of a subject fluid in fluids produced from a well. The valve 202 is useful in the following scenario. When the well 106 is first drilled and completed, a sample is taken of the product from the well 106 (block 1302). The sample is analyzed to determine the fraction of the subject fluid (e.g., water cut) in the product and the density of the oil in the product (block 1304). Additional samples of the same type are taken over time and the fraction of the subject fluid is monitored (block 1306). When the fraction of subject fluid reaches a threshold (block 1308), e.g., such that producing from the well is becoming less profitable (note that if the fraction of subject fluid has not reached the threshold ("N" branch from block 1308) processing returns to block 1306), it may be desirable to reduce the amount of fluids produced from a given zone 112a, 112b, 112c, etc. to improve the quality of production from the well 106 ("Y" branch from block 1308. To do this, the following procedure is performed.

Respective fractions of a subject fluid in respective fluids (i.e., fluid 213 for all or a subset of the valves 118a, 118b, 118c, etc.) flowing into a plurality of valves 118a, 118b, 118c, etc. are measured (block 1310). Each of the plurality of valves 118a, 118b, 118c, etc. controls an amount of respective fluid that flows into a production tubing 104 from a respective zone 112a, 112b, 112c, etc. in the well 106. The measured fraction of the subject fluid in the fluid flowing into the production tubing 104 from a one of the plurality of valves 118a, 118b, 118c, etc. is determined to be greater than a threshold (block 1312). The one of the plurality of valves 118a, 118b, 118c, etc. is adjusted to change the amount of respective fluid that flows into the production tubing 104 from the respective zone in the well 112a, 112b, 112c, etc. (block 1314) and processing returns to block 1306.

In another use, the valve 202 is useful in performing the processes described in U.S. Pat. No. 9,388,686, entitled "Maximizing Hydrocarbon Production While Controlling Phase Behavior or Precipitation of Reservoir Impairing Liquids or Solids" (the '686 patent), which is assigned to the assignee of the instant application. The valve 202 and the processing described above can be used to detect when the gas content of the fluid 213 entering the valve 202 through the inflow fluid input 210 is reaching the bubble point or when the content of another material in the fluid 213 entering the valve 202 through the inflow fluid input 210 reaches a point where it threatens to disrupt production from the well. The controllable inflow valve 244 can then be adjusted per the procedures described in the '686 patent.

FIG. 14A is a cross-sectional view of a valve or production tubing showing the use of a plurality of in-line densitometers and flow meters to determine holdup. FIG. 14B is a cross-sectional view of a valve or production tubing showing the use of a plurality of densitometers and flow meters inside tubes to determine holdup. FIG. 14C is a cross-sectional view of a valve or production tubing showing the use of a plurality of densitometers and flow meters in shrouded side tubes to determine holdup. In another use, the valve 202 is useful in determining "holdup," which is the relative volume of different phases (i.e., oil, water, gas) in the production tubing 104. Holdup is useful to know because the phases may move through the production tubing 104 at different speeds which might change the cut of each of the phases at the surface 108 compared to that at the depth of the zones 112a, 112b, 112c, etc. Typically, a water holdup measurement in the well-mixed range will give the water cut at that location.

A set of in-line densitometers and flow meters 1402 (only one is labeled), similar to the output flow meter 224 and the output densitometer 230 illustrated in FIG. 3, may be distributed around the inner perimeter of the production tubing 104, as shown in FIG. 14A. The density and flow measurements produced from the in-line densitometers and flow meters 1402 can be used to determine holdup.

A set of side tubes containing densitometers and flow meters 1404 (only one is labeled), similar to the side tubes 404, densitometers 410, and flow meters 412 illustrated in FIG. 4, may be distributed around the outer perimeter of the production tubing 104, as shown in FIG. 14B. The density and flow measurements produced from the side tubes containing densitometers and flow meters 1404 can be used to determine holdup.

The set of side tubes containing densitometers and flow meters 1404 may be shielded by a shroud 1406 similar to the shroud 502 illustrated in FIG. 5. The density and flow measurements produced from the side tubes containing densitometers and flow meters 1404 can be used to determine holdup.

Theoretical Proof-of-Concept

Figure 15:
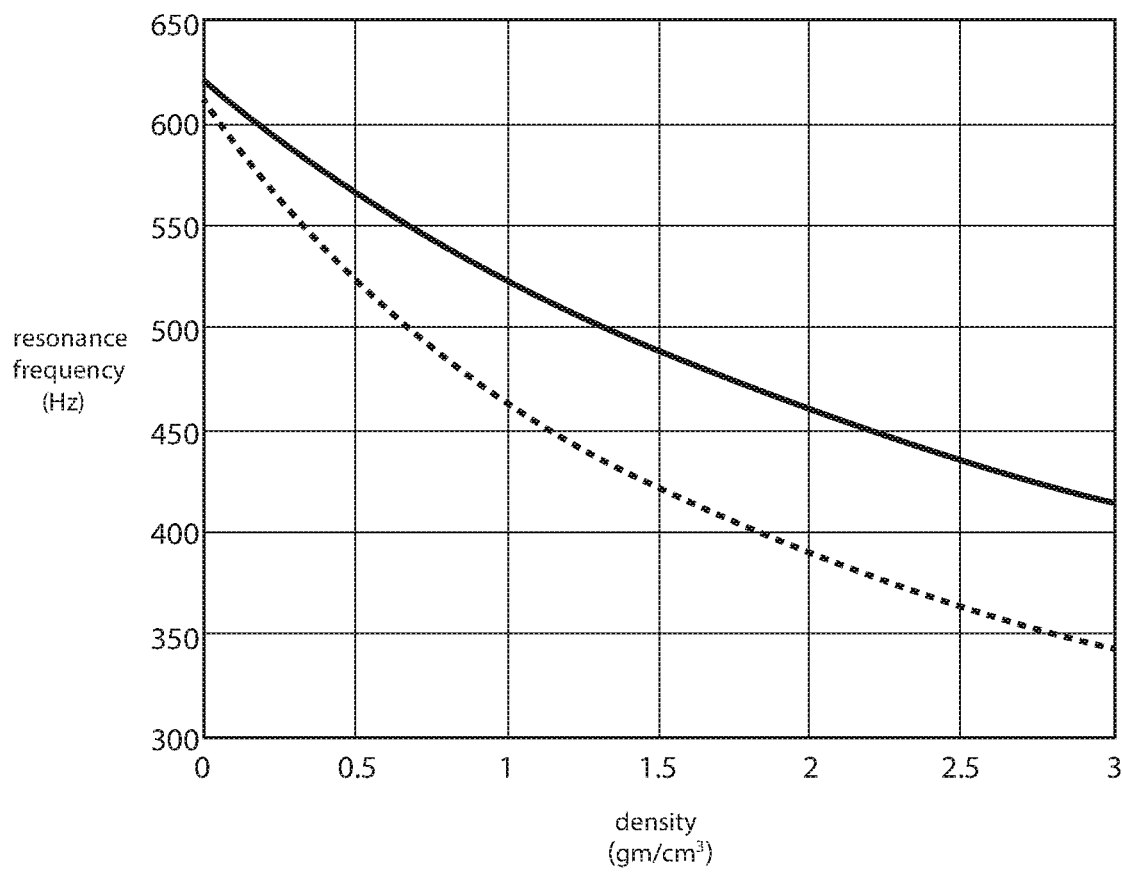
FIG. 15 is a graph depicting the fundamental resonance frequency characteristics of different materials in production tubing densitometers.

To verify that the proposed method has a measurable resonance frequency, a preliminary calculation comparing fundamental resonance frequencies in production tubing densitometers, as shown in the graph in FIG. 15, was undertaken. The units of the vertical axis in FIG. 15 are "resonance frequency" in Hertz (Hz) and the units of the horizontal axis are density in grams per cubic centimeter ($gm/cm^3$). In the preliminary simulation, the outside diameter of the production tubing was taken as 4.0 inches (10.16 centimeters (cm)), the inside diameter as 3.5 inches (7.62 cm), and the length as a 1 meter (3.37 feet). Two different materials, mild steel (the solid curve in FIG. 15) and titanium alloy (the dashed curve in FIG. 15), were considered. The results show that the resonance frequency using production tubing is in the several hundred Hz range.

From a sensitivity standpoint, the production line densitometer can perform with good resolution, regardless of tubing orientation. The production tubing densitometer is expected to provide an accuracy of better than +/−0.002 $gm/cm^3$ over a pressure range of 0 pounds per square inch (PSI) to 20,000 PSI and a temperature range of 75° F. to 350° F. under controlled conditions, giving an estimated resolution of at least 0.001 $g/cm^3$. Furthermore, because of the near-linear sensitivity slope in the oil and water density range (0.7-1.1 $g/cm^3$), the density sensor can be used for 0-100% water cut determination.

In one aspect, an apparatus includes a production tubing for carrying fluids from a producing zone to a surface and a resonant tube densitometer to measure the density of the fluids carried by the production tubing, the resonant tube densitometer having a tube. A longitudinal section of the production tubing is the tube of the resonant tube densitometer.

Implementations may include one or more of the following. An upper packer and a lower packer may anchor the longitudinal section of the production tubing. A pressure holding shroud may be around the longitudinal section of the production tubing. A vibration emitter may be coupled to the longitudinal section of the production tubing. The vibration emitter may include one or more of a piezoelectric source, a mechanical hammer, a mechanical tapper, and a generator of micro-explosions. The resonant tube densitometer may use a flow of fluid through the production tubing as a source of vibrations. A vibration sensor may be coupled to the longitudinal section of the production tubing. The vibration sensor may include one or more of an accelerometer, an optical sensor, a piezoelectric sensor, a flexoelectric sensors, and an electric strain gauge.

In one aspect, a method includes using a production tubing to carry fluids from a producing zone to a surface and using a resonant tube densitometer to measure the density of the fluids carried by the production tubing, the resonant tube densitometer having a tube. A longitudinal section of the production tubing is the tube of the resonant tube densitometer.

Implementations may include one or more of the following. The method may include anchoring the longitudinal section of the production tubing with an upper packer and a lower packer. The method may include surrounding the longitudinal section of the production tubing with a pressure holding shroud. The method may include coupling a vibration emitter to the longitudinal section of the production tubing. The vibration emitter may include one or more of a piezoelectric source, a mechanical hammer, a mechanical tapper, and a generator of micro-explosions. The method may include using a flow of fluid through the production tubing as a source of vibration. The method may include coupling a vibration sensor to the longitudinal section of the production tubing. The vibration sensor may include one or more of an accelerometer, an optical sensor, a piezoelectric sensor, a flexoelectric sensors, and an electric strain gauge.

In one aspect, a system includes a production tubing penetrating an upper zone and a lower zone in a well. The system includes a lower zone valve having a lower zone input coupled to the lower zone by which fluids from the lower zone enter the lower zone valve, a lower zone output by which fluid from the lower zone valve enters the production tubing, a lower zone control to control the amount of fluid from the lower zone valve that enters the production tubing, and a lower zone cut computer to measure a fraction of a subject fluid in a fluid flowing into the lower zone input. The system includes an upper zone valve having a first upper zone input coupled to the lower zone output of the lower zone valve through the production tubing, a second upper zone input coupled to the upper zone by which fluids from the upper zone enter the upper zone valve, an upper zone output by which fluid from the upper zone valve enters the production tubing, an upper zone control to control the amount of fluid from the upper zone valve that enters the production tubing, and an upper zone cut computer to measure a fraction of the subject fluid in a fluid flowing into the second upper zone input. The system includes a subject fluid controller coupled to the lower zone control and the upper zone control to control the amount of fluid from the lower zone valve that enters the production tubing and amount of fluid from the upper zone valve that enters the production tubing based on the fraction of the subject fluid in a fluid flowing into the lower zone input and the fraction of the subject fluid in a fluid flowing into the second upper zone input. One of the lower zone control or the upper zone control has a resonant tube densitometer to measure the density of the fluids carried by the production tubing, the resonant tube densitometer having a tube. A longitudinal section of the production tubing is the tube of the resonant tube densitometer.

Implementations may include one or more of the following. The system may include an upper packer and a lower packer that anchor the longitudinal section of the production tubing. The system may include a pressure holding shroud around the longitudinal section of the production tubing. The system may include a vibration emitter coupled to the longitudinal section of the production tubing and a vibration sensor coupled to the longitudinal section of the production tubing. The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus comprising:
    a production tubing disposed within a borehole to carry fluids from one or more producing zones to a surface;
    a three-way valve coupled to the production tubing, the three-way valve including an inlet formed by the production tubing, an outlet formed by the production tubing, a borehole inlet configured to receive fluid flow from the borehole surrounding the three-way valve, and a mixing chamber disposed between the inlet formed by the production tubing and the outlet formed by the production tubing, wherein the three-way valve is configured such that inflow from the inlet formed by the production tubing and inflow from the borehole inlet converge in the mixing chamber from which the converged inflows flow out from the outlet formed by the production tubing;
    a first resonant tube densitometer disposed in at least one of the outlet formed by the production tubing and the inlet formed by the production tubing, said first resonant tube densitometer configured to measure density of the fluids; and
    a first flow meter disposed in at least one of the outlet formed by the production tubing and the inlet formed by the production tubing, the first flow meter configured to measure volumetric flow of the fluids.

2. The apparatus of claim 1, wherein said first resonant tube densitometer is formed from a longitudinal section of the production tubing, said apparatus further comprising an upper packer and a lower packer that anchor the longitudinal section of the production tubing.

3. The apparatus of claim 2, further comprising a pressure holding shroud around the longitudinal section of the production tubing.

4. The apparatus of claim 2, further comprising a vibration emitter coupled to the longitudinal section of the production tubing.

5. The apparatus of claim 4, wherein the vibration emitter includes one or more of a piezoelectric source, a mechanical hammer, a mechanical tapper, and a generator of microexplosions.

6. The apparatus of claim 2, further comprising a vibration sensor coupled to the longitudinal section of the production tubing.

7. The apparatus of claim 6, wherein the vibration sensor includes one or more of an accelerometer, an optical sensor, a piezoelectric sensor, a flexoelectric sensor, and an electric strain gauge.

8. The apparatus of claim 1, wherein said first resonant tube densitometer uses a flow of fluid through the production tubing as a source of vibrations.

9. The apparatus of claim 1, further comprising:
    a second resonant tube densitometer disposed in the inlet formed by the production tubing, the second resonant tube densitometer configured to measure the density of the fluids; and
    a second flow meter disposed in the inlet formed by the production tubing, the second flow meter configured to measure volumetric flow of the fluids.

10. The apparatus of claim 9, further comprising:
    a third resonant tube densitometer disposed in the borehole inlet, the third resonant tube densitometer configured to measure the density of the fluids; and a third flow meter disposed in the borehole inlet, the third flow meter configured to measure volumetric flow of the fluids.

11. The apparatus of claim 10, further comprising:
a processor configured to receive outputs from two or more of the first resonant tube densitometer, the first flow meter, the second resonant tube densitometer, the second flow meter, the third resonant tube densitometer, and the third flow meter, and wherein the processor is configured to determine a fraction of a subject fluid in a fluid flowing through the production tubing based on one or more of the outputs.

12. The apparatus of claim 11, further comprising:
a controllable inflow valve that controls fluid input through the borehole inlet, wherein the controllable inflow valve is configured to adjust flow through the borehole inlet based on the determined fraction of the subject fluid.

13. The apparatus of claim 1, further comprising:
a second resonant tube densitometer disposed in the borehole inlet, the second resonant tube densitometer configured to measure the density of the fluids; and
a second flow meter disposed in the borehole inlet, the second flow meter configured to measure volumetric flow of the fluids.

14. The apparatus of claim 13, further comprising:
a third resonant tube densitometer disposed in the inlet formed by the production tubing, the third tube resonant densitometer configured to measure the density of the fluids; and
a third flow meter disposed in the inlet formed by the production tubing, the third flow meter configured to measure volumetric flow of the fluids.

15. The apparatus of claim 14, further comprising:
a processor configured to receive outputs from two or more of the first resonant tube densitometer, the first flow meter, the second resonant tube densitometer, the second flow meter, the third resonant tube densitometer, and the third flow meter, and wherein the processor is configured to determine a fraction of a subject fluid in a fluid flowing through the production tubing based on one or more of the outputs; and
a controllable inflow valve that controls fluid input through the borehole inlet, wherein the controllable inflow valve is configured to adjust flow through the borehole inlet based on the determined fraction of the subject fluid.

16. The apparatus of claim 1, further comprising a side tube coupled in parallel with a segment of the production tubing and forming a portion of the outlet formed by the production tubing such that a portion of the fluids flow through the side tube, and wherein the first resonant tube densitometer and the first flow meter are disposed within the side tube.

17. A system comprising:
a production tubing penetrating an upper zone and a lower zone in a well;
a lower zone valve having:
a lower zone input coupled to the lower zone by which fluids from the lower zone enter the lower zone valve;
a lower zone output by which fluid from the lower zone valve enters the production tubing;
a lower zone control to control an amount of fluid from the lower zone valve that enters the production tubing; and
a lower zone cut computer to measure a fraction of a subject fluid in a fluid flowing into the lower zone input;
an upper zone valve having:
a first upper zone input coupled to the lower zone output of the lower zone valve through the production tubing;
a second upper zone input coupled to the upper zone by which fluids from the upper zone enter the upper zone valve;
an upper zone output by which fluid from the upper zone valve enters the production tubing;
an upper zone control to control an amount of fluid from the upper zone valve that enters the production tubing; and
an upper zone cut computer to measure a fraction of the subject fluid in a fluid flowing into the second upper zone input; and
a subject fluid controller coupled to the lower zone control and the upper zone control to control the amount of fluid from the lower zone valve that enters the production tubing and amount of fluid from the upper zone valve that enters the production tubing based on the fraction of the subject fluid in a fluid flowing into the lower zone input and the fraction of the subject fluid in a fluid flowing into the second upper zone input;
wherein one of the lower zone control or the upper zone control has:
a resonant tube densitometer to measure density of the fluids carried by the production tubing, the resonant tube densitometer having a tube;
wherein a longitudinal section of the production tubing is the tube of the resonant tube densitometer.

18. The system of claim 17 further comprising an upper packer and a lower packer that anchor the longitudinal section of the production tubing.

19. The system of claim 17 further comprising a pressure holding shroud around the longitudinal section of the production tubing.

20. The system of claim 17 further comprising:
a vibration emitter coupled to the longitudinal section of the production tubing; and
a vibration sensor coupled to the longitudinal section of the production tubing.

* * * * *